United States Patent [19]

LeRoy

[11] Patent Number: 4,669,213

[45] Date of Patent: Jun. 2, 1987

[54] ILLUMINATED FISHING LURE WITH ELECTRICALLY CONDUCTIVE EYELETS PROVIDING MEANS TO RECHARGE THE CELL

[76] Inventor: Timothy LeRoy, 1456 Mara Vista Ct., Crofton, Md. 21114

[21] Appl. No.: 791,486

[22] Filed: Oct. 25, 1985

[51] Int. Cl.$^4$ ............................................. A01K 85/01
[52] U.S. Cl. .................................................... 43/17.6
[58] Field of Search ................ 43/17.6, 17.5; 362/183, 362/158

[56] References Cited

U.S. PATENT DOCUMENTS

| | | | |
|---|---|---|---|
| 2,431,420 | 11/1947 | Pope . | |
| 2,458,611 | 1/1949 | Long . | |
| 2,536,408 | 1/1951 | Addicks . | |
| 3,213,562 | 10/1965 | Salvin et al. . | |
| 4,085,538 | 4/1978 | Jankowski | 43/17.6 |
| 4,227,331 | 10/1980 | Ursrey | 43/17.6 |
| 4,322,782 | 3/1982 | Wong | 362/183 |
| 4,347,681 | 9/1982 | Fima | 43/17.6 |
| 4,437,256 | 3/1984 | Kulak . | |

FOREIGN PATENT DOCUMENTS 2506895 12/1982 France ................................ 362/158

Primary Examiner—Nicholas P. Godici
Assistant Examiner—G. M. Reid
Attorney, Agent, or Firm—Henderson & Sturm

[57] ABSTRACT

The combination of an improved illuminated fishing lure construction (10) and an external power source (13') for producing illumination within the sealed lure body unit (11); wherein the hollow body member (15) has a plurality of conductive surfaces (16) extending from the interior to the exterior of the hollow body member (15) and forming a portion of circuit means (14) contained within the hollow body member; wherein the circuit means (14) comprises rechargeable power source (13) and an illumination unit (12); whereby a charge may be transferred by the external power source (13') through said sealed body unit (11) to said rechargeable power source (13) to activate said illumination unit.

6 Claims, 12 Drawing Figures

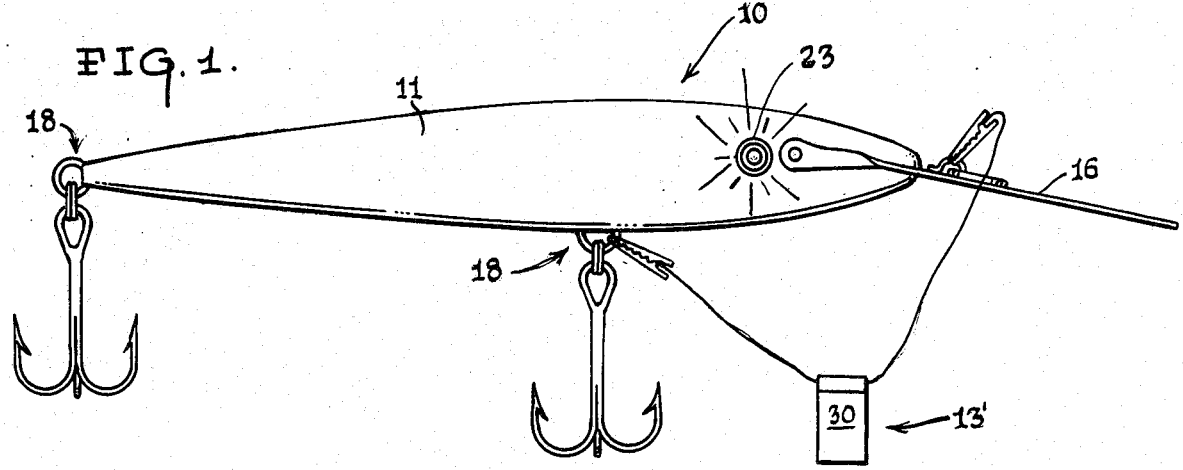
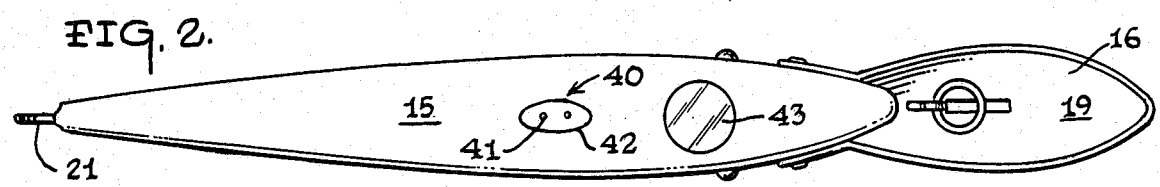
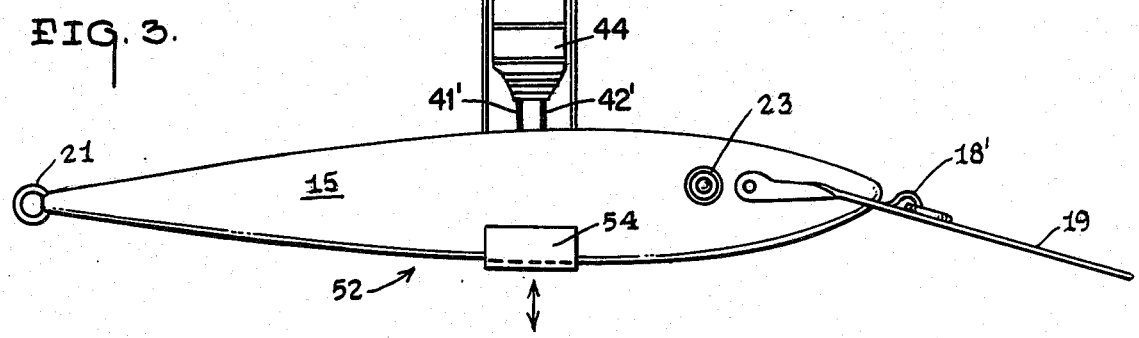
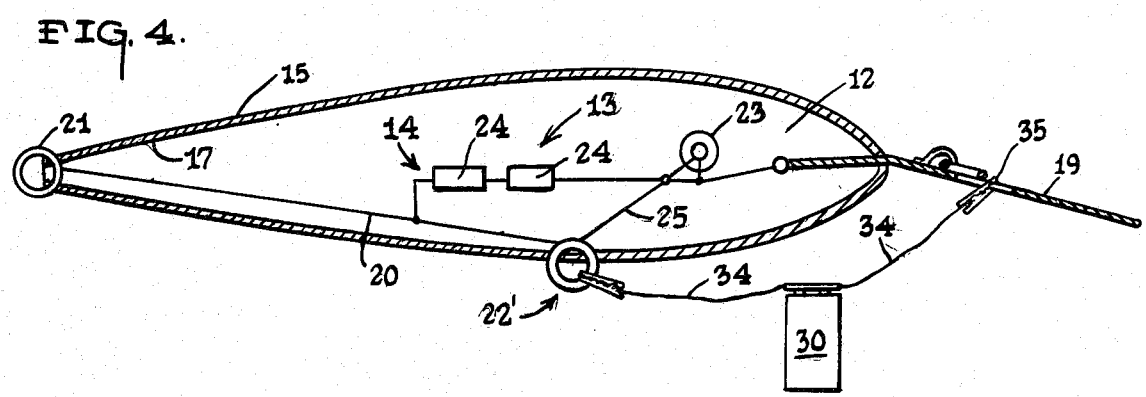

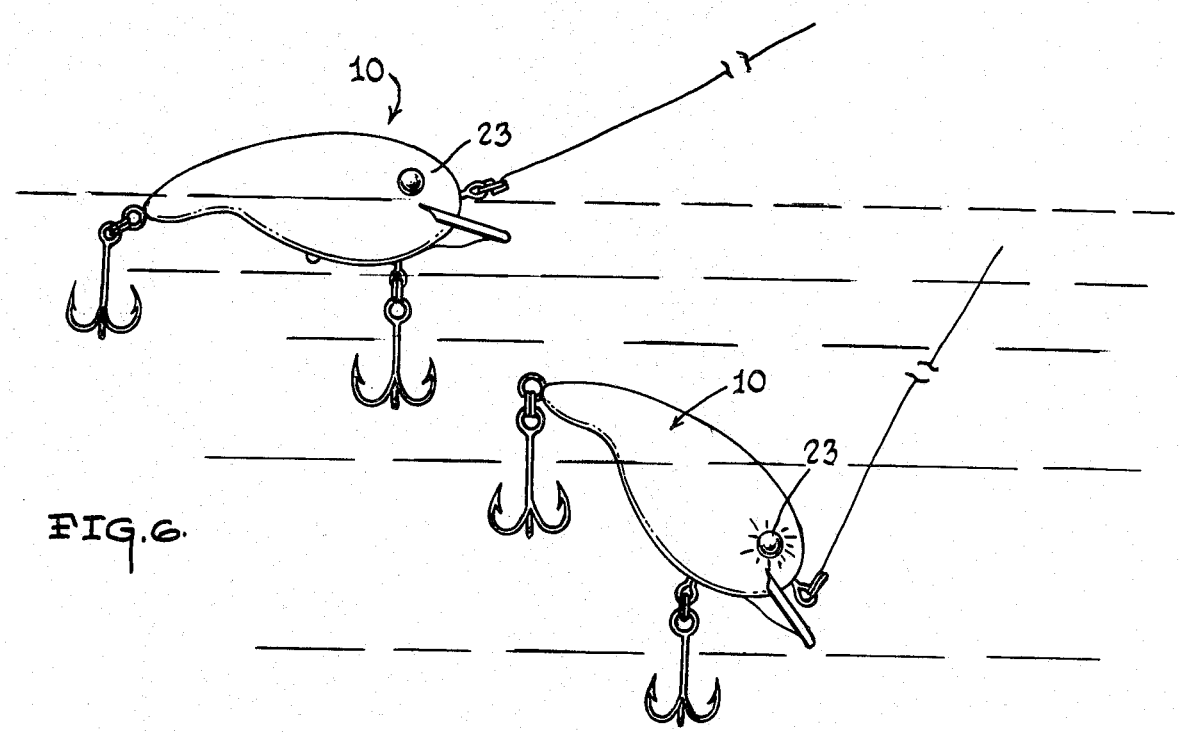
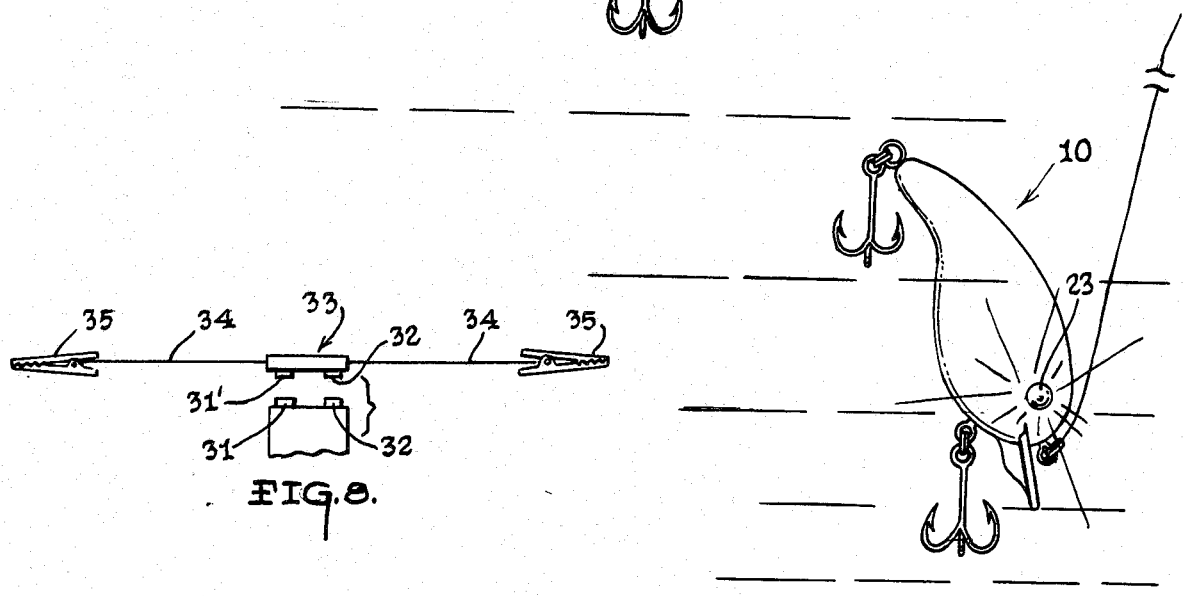
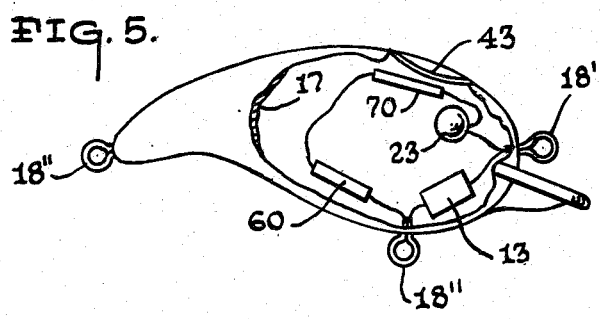
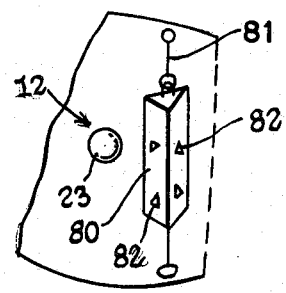

ILLUMINATED FISHING LURE WITH ELECTRICALLY CONDUCTIVE EYELETS PROVIDING MEANS TO RECHARGE THE CELL

TECHNICAL FIELD

The present invention relates generally to the field of illuminated line attached bodies used for fishing.

BACKGROUND OF THE INVENTION

A well recognized method of attracting and catching fish involves the provision of a source of illumination which is associated with the lure body, as is evident by virtue of the teachings and structure contained in the following U.S. Pat. Nos.: 4,437,256; 2,536,408; 2,458,611 and 2,431,420.

In fact illuminated lures have proven so successful in attracting and catching fish, that they have been banned from use in many fishing tournaments, and have been declared illegal for use in some states.

In those states where the use of illuminated lures is permissable, the commercially available prior art constructions have not found widespread consumer acceptance, despite their proven effectiveness in catching fish, due to the following factors: short battery life due to continuous power usage required by the simple on/-off switch or actuating mechanism found on virtually all of the prior art constructions; constant power drain requirements imposed on the battery regardless of whether or not lure is in or out of the water; the tendency of the user to forget that the battery circuit is operational, while in transit from one location to another; and, also the failure of many users, particularly on very bright sunny days, to detect or notice the illumination, due to the intense ambient light conditions, and to subsequently return the illuminated lure into long term storage in their tackle boxes, with that actions attendent consequences only being evident the next time the angler wishes to use the lure.

As a result of the observed deficiencies in the prior art constructions; it became apparent that the only way for illuminated lures to gain widespread commercial success would be, to eliminate as much as possible the non-useful illumination periods, and also devise safeguards against the inadvertent or neglectful actuation of the battery circuitry during the storage of the lure in a tackle box or the like.

The end result of the research devoted to arriving at a solution to the above enumerated problems is embodied on the subject matter that forms the basis of the present invention.

SUMMARY OF THE INVENTION

The present invention contains the following features which are broadly acknowledged to be in the public domain: a hollow lure body configured to resemble small bait fish or other edible aquatic marine life; one or more fish hooks associated with the lure body; means on the lure body for tying a fishing line thereto; and, an illumination means comprising: a source of illumination; a power source; circuitry between the source of illumination and the power source; and, a switch mechanism which allows current to flow through the circuitry between the power source and the source of illumination.

The structural and functional improvements embodied in this invention center around the rechargeable illumination transmittal means and the power conservation and fail-safe features built into the illumination means per se. The primary areas of novelty are also specifically directed to insuring that under most circumstances the source of illumination will not be activated until needed, or until the lure is either submerged and/or at a certain depth; and, in one particular embodiment of this invention the degree of intensity of illumination source is directly related to the ambient light present at various submerged depths.

BRIEF DESCRIPTION OF THE DRAWINGS

These and other objects, advantages and novel features of this invention will become apparent from the detailed description of the best mode for carrying out the preferred embodiment of the invention which follows, particularly when considered in conjunction with the accompanying drawings wherein:

FIG. 1 is a perspective view of the preferred rechargeable embodiment of this invention;

FIG. 2 is a top view of an alternate rechargeable version of this invention;

FIG. 3 is a side elevation view of the alternate version of the preferred embodiment with a specially designed recharging unit;

FIG. 4 is a cross-sectional view of the preferred embodiment of FIG. 1;

FIG. 5 is another alternative version of the preferred embodiment;

FIG. 6 is an action sequence of the depth and angle sensitive version of the preferred embodiment;

FIG. 7 is a detail view of a reflective prism arrangement for the illumination means;

FIG. 8 is an enlarged detail view of the charging apparatus for use with the preferred embodiment;

BEST MODE FOR CARRYING OUT THE INVENTION

Figure 11:
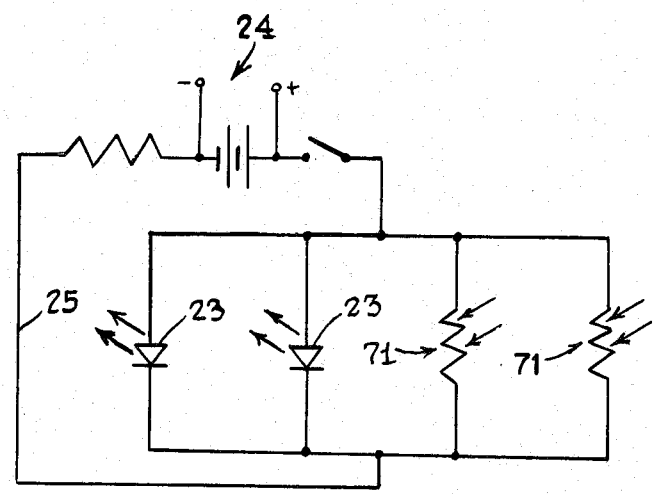
FIGS. 10 thru 12 are circuit diagrams for use in the present invention.

As can best be seen by reference to FIG. 1, the illuminated fishing lure of the present invention is designated generally as (10). The fishing lure (10) comprises in general a sealed body unit (11), an illumination unit (12), a rechargeable power source (13) and circuit means (14) for providing current from the power source (13) to the illumination unit (12).

In addition the fishing lure (10) of the preferred embodiment is specifically designed to be used in combination with an external power source (13') whereby electrical energy may be transferred through the sealed lure body unit (11) to the rechargeable power source (13) whereby the power source (13) may be periodically recharged during use.

As can best be seen by reference to FIGS. 1 and 4, the body unit (11) comprises a hollow body member (15) having at least two spaced conductive surfaces (16) extending through the sealed walls (17) of the body member (15). In as much as virtually all fishing lures have conductive eyelet elements (18) associated with the lure body member (15) in the form of line attaching (18') and hook attaching (18") eyelets, this invention may be practiced without having to modify the exterior surface of the lure, as will be explained in greater detail further on in the specification.

It should also be noted that in those instances as depicted in FIGS. 1 and 4, wherein the lure body member (15) is provided with a metal diving lip (19), this diving lip forms another conductive surface (16) that may be used to practice this invention.

Referring specifically to FIG. 4, it can be seen that the two hook attaching eyelets (18") are conductively joined by a length of wire (20) that extends from the tail eyelet (21) to the body eyelet (22). This length of wire also forms part of the circuit means (14) mentioned previously.

In the embodiment illustrated in FIG. 4, the illumination unit (12) comprises at least one light emitting diode or LED (23) or other suitable light source (not shown) such as an incandescent light bulb or the like. The rechargeable power source (13) comprises a nickel-cadmium rechargeable cell (24) or any other type of rechargeable cell such as silver-mercury or the like. It is only necessary to practice this invention that the cell (24) be capable of receiving a large number of charges during its useful life; and, that the charges are capable of being administered through the sealed lure body member (15) by an external power source (13').

This last point is of particular importance in as much as the prior art structure invariably provide an aperture with a removeable closure so that replacement batteries may be inserted into the lure body interior. First of all this procedure is quite bothersome to most fishermen; and, by virtue of this structural arrangement the interior of the lure is subject to water seepage, which will unbalance the lure swimming motion, and also promote the corrosion of the lure circuitry and the batteries.

The circuit means (14) of the preferred embodiment comprises an electrical lead (25) in the form of a lead wire extending from one of the conductive surfaces (16) on the forward portion of the lure body, to one of the other conductive surfaces (16) on the lure body. It being understood that the conductive surfaces (16) act as positive and negative charging contacts for the circuit means (14). In addition the electrical lead (25) also is connected to illumination unit (12) and the rechargeable power source (13) in a well recognized fashion, to complete the electrical circuit.

As can be seen by reference to FIGS. 1 and 8 the external power source (13') of the preferred embodiment comprises: an external battery unit (30) such as a 9 volt battery or the like; wherein the external battery unit (30) has a male (31) and female (32) contact; and, an adapter unit (33) having complementary male (32') and female (31') connector members, each of which being provided with an elongated flexible lead elements (34) having a releasable clip member (35) disposed on its free end.

As shown in the drawings the preferred external power source (13') comprises a very compact unit that will occupy very little space either on the user's person or in the users tackle box. It should also be appreciated that, the external charging of the rechargeable power source (13) within the lure body (11) is accomplished simply by attaching the clip members (35) having the proper polarity to the positive and negative conductive surfaces (16) on the lure body unit (11).

It should further be noted at this juncture that a prototype lure built in accordance with the teachings of this invention and having a rechargeable power source (13) comprising two 1.5 V nicads; and, an illumination unit comprising two LED's (23) drawing 1.5 V at 20 mA when charged by a 9 V battery produced the following results: one minute of charge produced eight minutes of bright illumination followed by sixteen minutes of low intensity illumination; and a thirty second charge produced over ten minutes of illumination.

It should also be noted at this juncture that field tests have shown a marked tendency for the lower levels of illumination to produce the best results, particularly when used in conjunction with a green light source. It should further be noted that the prior art replaceable battery type illuminated lures only produce these low levels of illumination for a relatively short duration at the end of the useful life of the replaceable battery.

It should still further be noted that under certain circumstances, should the fish seem to be responding more favorably during the higher illumination periods; it is a very simple matter for the user to respond to those conditions by increasing the duration and frequency of the application of the external power source.

In an alternate embodiment illustrated in FIGS. 2 and 3 the top (40) of the hollow body member (15) of the lure body unit (11) is structurally altered by the provision of a sealed wall portion (17') having a pair of distinct positive (41) and negative (42) pole members extending from the inside to the outside of the hollow body member (15). In addition, the hollow body member (15) is further provided with a transparent panel element (43) for the purpose of allowing ambient light to impinge on the interior of the hollow body member (15), when the hollow body member (15) the light sensitive circuitry that will be described later on in the specification.

The alternate embodiment depicted in FIG. 3 also requires a specially designed external power source (31') due to the recessed location of the positive (41) and negative (42) contacts on the top (40) of the lure body. In this embodiment the external power source (31') comprises an elongated generally cylindrical housing member (44) comprising at least one external battery unit (30') electrically connected to positive (41') and negative (42') prong contacts that are dimensioned to contact the recessed contacts (41) and (42) to effect the charging process.

It should further be noted that while the elongated generally cylindrical housing member (44) may manually be brought into contact with the lure body unit (15) this arrangement has proved relatively cumbersome; and, as a result a lure and charger holder member (50) has been developed to simplify the charging of this alternate embodiment.

As can be seen by reference to FIG. 3 the lure and charger holder assembly (50) comprises an upper (51) and lower (52) holder element, which are relatively moveable with respect to one another. The upper holder element (51) is further provided with a clamp element (53) that releasably secures the elongated generally cylindrical housing member (44) which contains the external battery unit (30'); and, the lower holder element (52) is provided with a generally L-shaped shelf element (54) that positions and supports the lure body unit (11) during the charging process.

A modified version of the preferred embodiment is depicted in FIGS. 5 and 6, and this version contains several features that are intended for use either alone or in combination with one another in various production models of the preferred embodiment. As shown in FIG. 5, the upper portion of the hollow body member is provided with: a transparent panel element (43); a mercury switch element (60); and, a photosensitive resistor element (70).

As depicted in FIG. 6, when the lure (10) is resting on the surface of the water, the mercury switch (60) is in the open position and the LED (23) is inactivated. Once the lure (10) assumes a downward inclination during the retrieval phase, the mercury switch (60) closes to complete the circuitry and illuminate the LED (23). As the lure (10) reaches greater depths, the amount of ambient light sensed by the photosensitive resistor element (70) through the transparent panel element (43) diminishes, and the current to the LED (23) increases, thereby increasing the intensity of the illumination as the depth increases.

In another proposed version of the preferred embodiment depicted in FIG. 7, a prism element (80) is suspended intermediate the illumination unit (12) and a transparent panel element (43); whereby the light beams eminnating from the illumination unit (12) will be diffracted at various angles. To further enhance this diffraction phenomina, the prism element (80) may be suspended by swivel elements (81) and/or provided with reflective particles (82).

Figure 9:
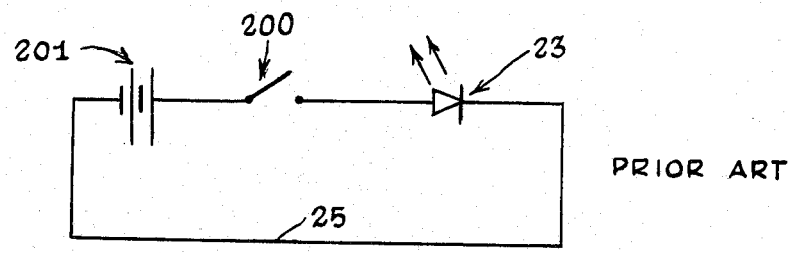
FIG. 9 is a circuit diagram representative of the prior art illuminated lures.

As mentioned previously FIG. 9 depicts the prior art circuitry wherein a manually operable switch (200) controls the delivery of current from a replaceable battery (201) to a LED (23).

Figure 10:
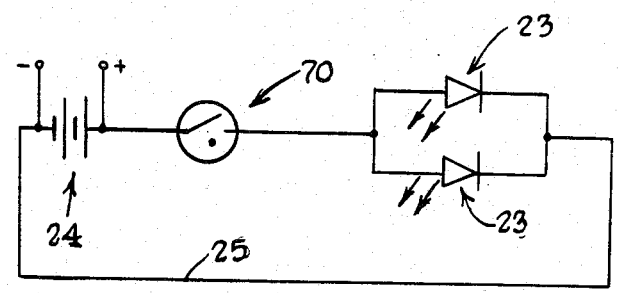
Figure 12:
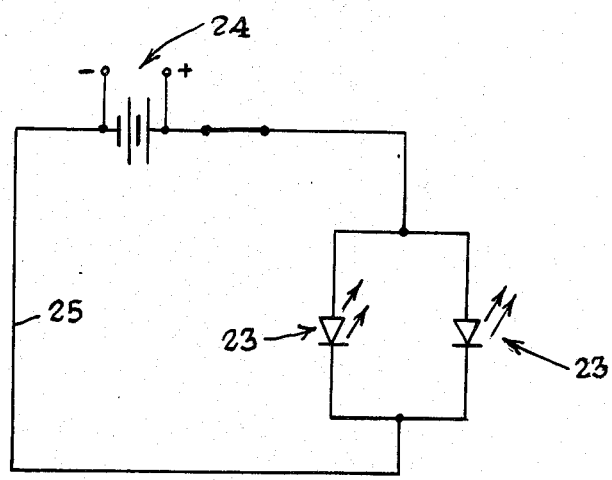

As shown in FIG. 10, a mercury switch (70) controls the delivery of current from the rechargeable cell (24) to the LED's (23). In FIG. 11, the photosensitive resistor elements (71) control the amount of current that passes through the LED's (23); and, in FIG. 12 the basic recharging circuit is depicted, wherein the amount of current passing through the LED's (23) is entirely dependent upon the charge remaining in the rechargeable cell (24).

It should be obvious at this point that, an invention built in accordance with the teachings and structure contained herein represents a quantum advancement over the prior art constructions, which employ permanently sealed and short lived battery sources, or replaceable battery sources with their own unique problems.

Having thereby described the subject matter of this invention it should be apparent that many substitutions, modifications and variations are possible in light of the above teachings. It is therefore to be understood that the invention as taught and described herein is only to be limited to the extent of the breadth and scope of the appended claims.

I claim:

1. An improved illuminated fishing lure construction in combination with an external power source having positive and negative lead elements provided with releasable clip members, wherein, the improved illuminated fishing lure construction consists of:
    a lure body unit comprising a sealed hollow body member having a plurality of conductive eyelet elements extending from the interior to the exterior of the sealed hollow body member, wherein, at least two of the said plurality of conductive eyelet elements are electrically connected to lengths of conductive wire; and,
    a circuit means disposed within the said hollow body member and provided with a rechargeable power source and an illumination unit; wherein, said lengths of conductive wire form a portion of said circuit means and said pair of conductive eyelets form positive and negative terminals for said circuit means, whereby the rechargeable power source may be operatively connected to the external power source via the releasable clip members, wherein said eyelets which form said positive and negative terminals are selected from the group consisting of hook attaching eyelets with at least one fishing hook attached thereto and line attaching eyelets capable of having a line passed therethrough.

2. The improved illuminated fishing lure construction of claim 1; wherein, said pair of conductive eyelet elements comprise:
    at least one hook attaching conductive eyelet element.

3. The improved illuminated fishing lure construction of claim 1; wherein, said pair of conductive eyelet elements comprise:
    at least one line attaching conductive eyelet element.

4. An improved illuminated fishing lure construction in combination with an external power source for producing illumination in the fishing lure; wherein, the combination comprises:
    a sealed hollow body member having a plurality of electrically conductive eyelet elements including both line attaching and hook attaching eyelets extending from the interior to the exterior of the hollow body member; wherein, at least one of the hook attaching eyelets is provided with a fish hook and further; wherein, the line attaching eyelet is capable of having a line passed therethrough;
    a circuit means contained within the hollow body member and operatively connected to at least two of said plurality of electrically conductive eyelet elements selected from the group consisting of said line attaching eyelets and said hook attaching eyelets; wherein, said circuit means further comprises a rechargeable power source and an illumination unit; and,
    the external power source includes a pair of elongated elements connected to the positive and negative poles of said external power source; wherein, the elongated elements are dimensioned to contact at least two of said plurality of electrically conductive surfaces for the purpose of transferring an electrical charge through said sealed hollow body member, from said external power source to said rechargeable power source.

5. The combination as in claim 4; wherein, the sealed body member further comprises:
    a transparent element.

6. The combination as in claim 5; wherein, the sealed hollow body member further comprises:
    a light diffracting prism disposed intermediate said illumination unit and said transparent element.

* * * * *